United States Patent
Wu et al.

(10) Patent No.: US 8,208,400 B2
(45) Date of Patent: Jun. 26, 2012

(54) METHOD FOR TESTING WIRELESS CONNECTION OF ELECTRONIC DEVICE

(75) Inventors: Wen-Yi Wu, Shenzhen (CN); Xiao-Fei Liu, Shenzhen (CN); Wen Deng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 202 days.

(21) Appl. No.: 12/551,730

(22) Filed: Sep. 1, 2009

(65) Prior Publication Data

US 2010/0302972 A1 Dec. 2, 2010

(30) Foreign Application Priority Data

Jun. 2, 2009 (CN) .......................... 2009 1 0302852

(51) Int. Cl.
*G01R 31/08* (2006.01)
(52) U.S. Cl. ......... 370/253; 370/232; 370/328; 455/423
(58) Field of Classification Search .......... 370/242–253, 370/328; 455/523, 423; 709/227; 704/228; 702/188
See application file for complete search history.

(56) References Cited

U.S. PATENT DOCUMENTS

| | | | | |
|---|---|---|---|---|
| 7,542,762 | B2* | 6/2009 | Uchida et al. | 455/423 |
| 7,707,031 | B2* | 4/2010 | Saraby | 704/228 |
| 7,835,886 | B2* | 11/2010 | Vogel et al. | 702/188 |
| 7,940,717 | B2* | 5/2011 | Twitchell, Jr. | 370/328 |
| 8,018,850 | B2* | 9/2011 | van Beek et al. | 370/232 |
| 2005/0047364 | A1* | 3/2005 | Matsukura et al. | 370/328 |
| 2005/0064870 | A1* | 3/2005 | Gabara et al. | 455/438 |
| 2006/0259629 | A1* | 11/2006 | Usmani et al. | 709/227 |
| 2007/0230393 | A1* | 10/2007 | Sinha et al. | 370/328 |
| 2010/0080144 | A1* | 4/2010 | Greenberg et al. | 370/253 |

* cited by examiner

*Primary Examiner* — Kwang B Yao
*Assistant Examiner* — Vincelas Louis
(74) *Attorney, Agent, or Firm* — Altis Law Group, Inc.

(57) ABSTRACT

A method for testing a wireless connection of an electronic device includes the following steps. The electronic device is initialized to a stand-by state. A testing server connects the electronic device to form a wireless connection based on a wireless protocol. The testing server outputs a plurality of first data packages to the electronic device and receives a plurality of second data packages from the electronic device to test a rate of data throughput via the wireless connection by the testing server. A wake-up signal is sent to the electronic device via the wireless connection to the electronic device.

1 Claim, 2 Drawing Sheets

METHOD FOR TESTING WIRELESS CONNECTION OF ELECTRONIC DEVICE

BACKGROUND

1. Technical Field

The disclosure generally relates to methods for testing electronic devices, especially to a method for testing a wireless connection of an electronic device.

2. Description of Related Art

Consumer electronic devices, such as mobile phones, notebook computers, digital photo frames etc, usually have wireless functions for data transmission, such as Wireless Fidelity (WiFi) and Bluetooth™. To ensure that a wireless connection of an electronic device is functioning as expected requires a series of tests before being put into use. Typically, in a laboratory, electronic devices are subjected to functional tests performed by R&D engineers for validating the performance thereof.

A functional test line of the electronic devices has many workstations, each of which has one test for a component or a functional item. In a conventional testing procedure, the testing of a wireless connection is performed manually through operating each of the electronic devices.

DETAILED DESCRIPTION

Figure 1:
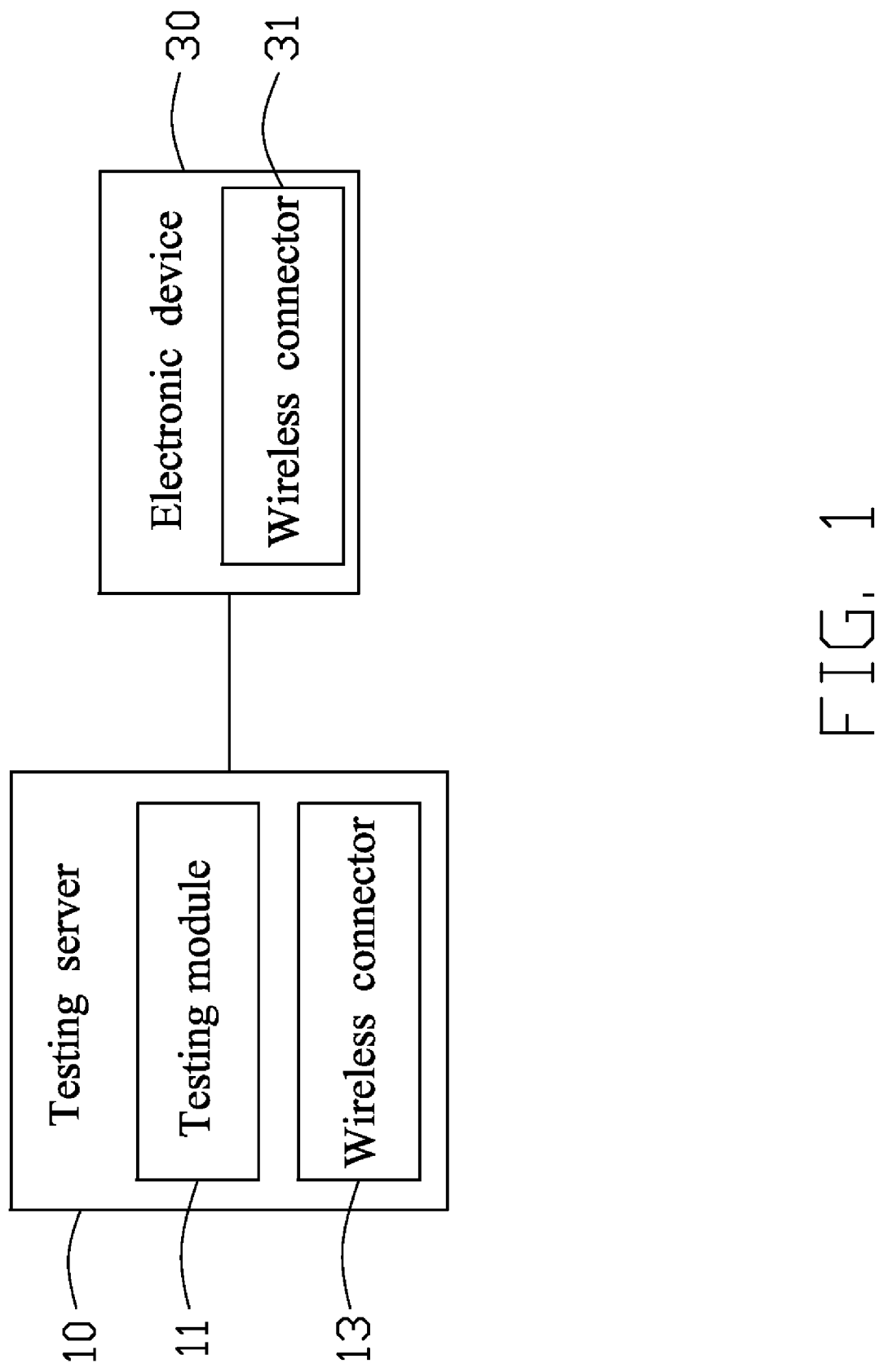
FIG. 1 is a block view showing a connection relationship of a testing server and an electronic device.

Referring to FIG. 1, a testing system includes a testing server 10 and a to-be-tested electronic device 30. The electronic device 30 is equipped with a wireless connector 31. The testing server 10 includes a testing module 11 and a wireless connector 13. The testing server 10 can search for and connect to the electronic device 30 through the wireless connector 13 based on a wireless protocol. The wireless protocol can be IEEE 802.11 standard, Bluetooth™ standard, or infra-ray standard for example. The testing module 11 can send test commands to the electronic device 30 to test a wireless connection function of the electronic device 30. Once the wireless connection is successfully formed between the testing server 10 and the electronic device 30, the electronic device 30 is under control of the testing server 10 and can be automatically operated by the testing server 10. The testing server 10 can connect to more than one electronic device at a time.

Figure 2:
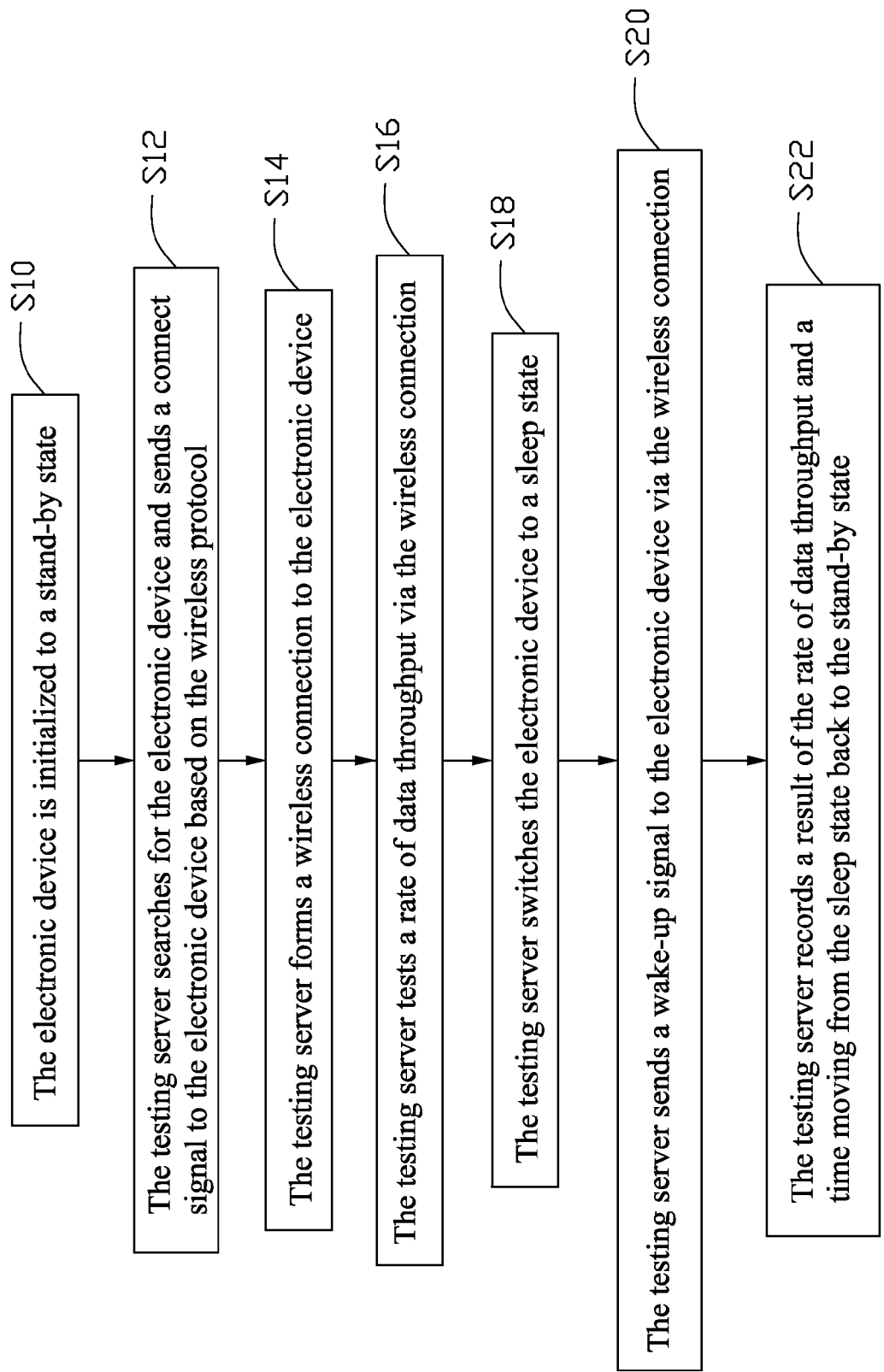
FIG. 2 is a flowchart of a method for testing a wireless connection of an electronic device.

Referring to FIG. 2, a method for testing a wireless connection of an electronic device 30 includes the following steps.

In step 10, the testing server 10 is powered on, and the electronic device 30 is initialized to a stand-by state, wherein the stand-by state is a normal working state of the electronic device 30.

In step 12, the testing server 10 searches for the electronic device 30 and sends a connect signal to the electronic device 30 based on the wireless protocol.

In step 14, the testing server 10 forms a wireless connection with the electronic device 30. When a wireless connection is successfully formed, a wireless connection test is passed.

In step 16, the testing server 10 outputs a plurality of first data packages to the electronic device 30 and receives a plurality of second data packages from the electronic device 30 to test a rate of data throughput via the wireless connection. The testing server 10 calculates the rate of data throughput according to a volume of the first data packages and the second data packages versus time. If the volume falls into a pre-determined range, the rate of the data throughput is passed. In communication networks, such as Ethernet or packet radio, throughput or network throughput is the average rate of successful message delivery over a communication channel. This data may be delivered over a physical or logical link, or pass through a certain network node. The throughput is usually measured in bits per second (bit/s or bps), and sometimes in data packets per second or data packets per time slot.

In step 18, the testing server 10 switches the electronic device 30 to a sleep state, or a power-saving state.

In step 20, the testing server 10 sends a wake-up signal to the electronic device 30 via the wireless connection to wake up the electronic device 30 to the stand-by state.

In step 22, the testing server 10 records a result of the rate of data throughput and a time moving from the sleep state to the stand-by state of the electronic device 30. The electronic device 30 may send a first signal to the testing server 10 when the electronic device 30 is woken up, and send a second signal to the testing server 10 if the electronic device 30 fails to wake up after a determined period of time.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A method for testing a wireless connection of an electronic device, the method comprising:
   initializing the electronic device to a stand-by state;
   forming the wireless connection based on a wireless protocol between a testing server and the electronic device;
   outputting a plurality of first data packages to the electronic device and receiving a plurality of second data packages from the electronic device by the testing server to test a rate of data throughput via the wireless connection;
   switching the electronic device from the stand-by state to a sleep state by the testing server;
   sending a wake-up signal to the electronic device via the wireless connection to the electronic device; and
   recording a switch rate of data throughput via the wireless connection from the sleep state to the stand-by state of the electronic device;
   wherein the testing server calculates the rate of data throughput according to a volume of the first data packages and the second data packages versus time;
   if the volume falls into a pre-determined range, the rate of the data throughput is passed.

* * * * *